(12) United States Patent  (10) Patent No.: US 8,826,457 B2
Chamarty et al.  (45) Date of Patent: Sep. 2, 2014

(54) SYSTEM FOR ENTERPRISE DIGITAL RIGHTS MANAGEMENT

(75) Inventors: Sitaram Venkata Chamarty, Andhra Pradesh (IN); Marc-Andre Laverdiere-Papineau, Andhra Pradesh (IN); Arun Kandadai Ramachandran, Tamil Nadu (IN)

(73) Assignee: Tata Consultancy Services Limited, Mumbai (IN)

( * ) Notice: Subject to any disclaimer, the term of this patent is extended or adjusted under 35 U.S.C. 154(b) by 47 days.

(21) Appl. No.: 13/567,993

(22) Filed: Aug. 6, 2012

(65) Prior Publication Data

US 2013/0024948 A1  Jan. 24, 2013

Related U.S. Application Data

(63) Continuation of application No. 13/331,763, filed on Dec. 20, 2011.

(30) Foreign Application Priority Data

Apr. 6, 2011  (IN) .......................... 1162/MUM/2011

(51) Int. Cl.
*G06F 21/00*  (2013.01)
*G06F 21/62*  (2013.01)

(52) U.S. Cl.
CPC .... *G06F 21/6209* (2013.01); *G06F 2221/2141* (2013.01); *G06F 2221/2107* (2013.01)
USPC ........................................................ 726/28

(58) Field of Classification Search
None
See application file for complete search history.

(56) References Cited

U.S. PATENT DOCUMENTS

2004/0054893 A1* 3/2004 Ellis .............................. 713/165
2010/0235649 A1* 9/2010 Jeffries et al. ................. 713/189

OTHER PUBLICATIONS

Yang et al., "Enterprise Digital Rights Management: Solutions Against Information Theft by Insiders", the Stony Book University, (2004), pp. 1-26.
Bertino et al., "TRBAC: A Temporal Role-Based Access Control Model", Transactions on Information and System Security, vol. 4, No. 3, (Aug. 2001), pp. 191-223.
Huawei Symantec, Document Security Solution, http://www.huaweisymantec.com/en/Product_solution/solutions/security_solutions/20, (2011), pp. 1-5.
Hu et al., Assessment of Access Control Systems, National Institute of Standards and Technology, (Sep. 2006), pp. 1-60.
Lucid IQ, "Document Security Controls", (2006), 4 pages.

* cited by examiner

*Primary Examiner* — Jeffrey Pwu
*Assistant Examiner* — Nega Woldemariam
(74) *Attorney, Agent, or Firm* — Barnes & Thornburg LLP

(57) ABSTRACT

The present subject matter relates to devices and methods for enterprise digital rights management. In one implementation, a device includes a security module configured to generate a security key. The security module encrypts at least one document of a user, using the security key, to generate a protected document. Further, the device includes an access control module configured to assign an access right to one or more users within an enterprise for accessing the protected document. The access control module is further configured to delegate the access right from the user to another user. The access control module is furthermore configured to lock at least one of the user and the protected document.

20 Claims, 5 Drawing Sheets

SYSTEM FOR ENTERPRISE DIGITAL RIGHTS MANAGEMENT

CROSS REFERENCE TO RELATED APPLICATIONS

This application is a continuation application of U.S. application Ser. No. 13/331,763, filed Dec. 20, 2011, which claims priority under 35 U.S.C. §119 to Indian Application No. 1162/MUM/2011, filed on Apr. 6, 2011, the entireties of which are incorporated herein by reference.

TECHNICAL FIELD

The present subject matter relates, in general, to digital rights management and, in particular, to devices and methods for enterprise digital rights management

BACKGROUND

In general, organizations, such as government agencies, financial institutions and professional companies, store and process their confidential information in digital format. Such confidential information may include product overviews, marketing plans, customer lists, and sales reports. In contrast to traditionally used print format, the digital format has improved the efficiency of handling the confidential information as well as maintaining its reliability. Organizations typically process the confidential information by sharing the confidential information in form of digital files through protected file servers, and distributing such digital files via downloads or email messages.

However, such digital files make the confidential information more vulnerable to unauthorized parties as the digital files are typically stored electronically on a central server within the organization, and external attackers or intruders may infiltrate into the organization through the organization's network to access such digital files. Further, apart from external attackers, people inside the organization, such as company employees having access to confidential information, may also disclose confidential information to non-trusted parties, either unintentionally or deliberately. Industry research indicates that leakage and theft of confidential information by internal attackers causes more damage to organizations all over the world than security breaches by external attackers.

SUMMARY

This summary is provided to introduce concepts related to devices and methods for enterprise digital rights management. These concepts are further described below in the detailed description. This summary is not intended to identify essential features of the claimed subject matter nor is it intended for use in determining or limiting the scope of the claimed subject matter.

In one implementation, a device includes a security module configured to generate a security key. The security module encrypts at least one document of a user, using the security key, to generate a protected document. Further, the device includes an access control module configured to assign an access right to one or more users within an enterprise for accessing the protected document. The access control module is further configured to delegate the access right from the user to another user. The access control module is furthermore configured to lock at least one of the user and the protected document.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
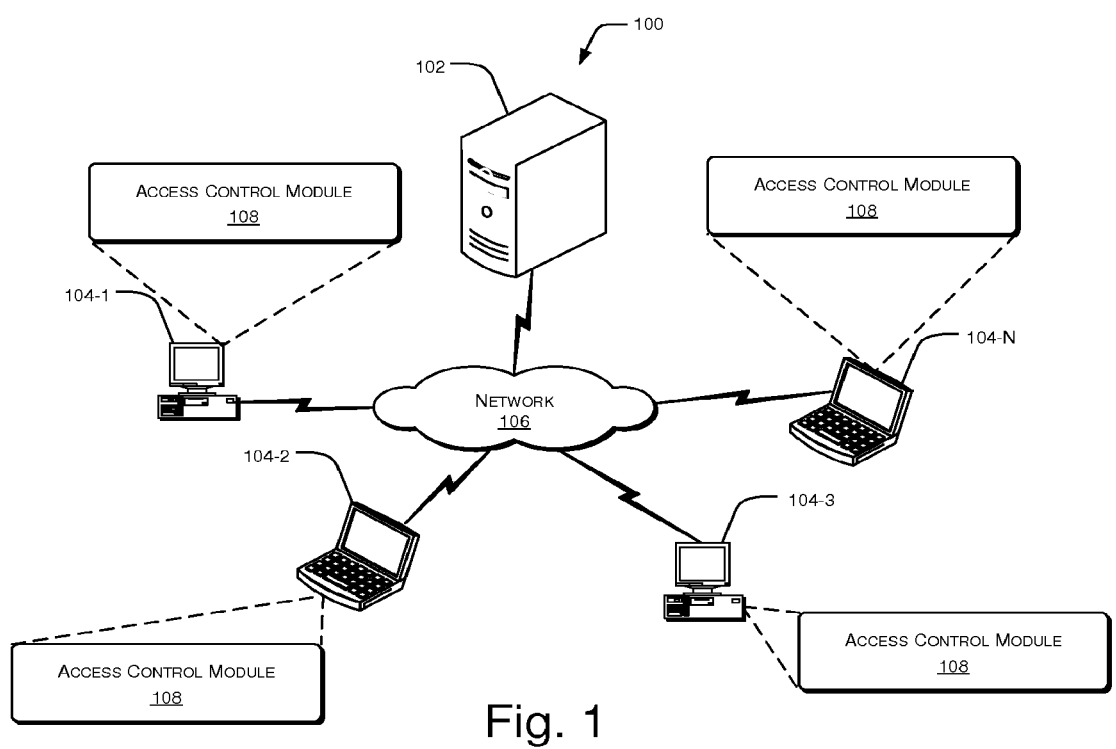
FIG. 1 illustrates an enterprise digital rights management (eDRM) network environment implementing eDRM devices, in accordance with an embodiment of the present subject matter.

The present subject matter relates to devices and methods for enterprise digital rights management for protecting documents of an enterprise and controlling access to the protected documents. In one example, the documents may contain confidential information, such as product overviews, marketing plans, customer lists, and sales reports in digital format.

Conventional techniques used for protection of the documents within enterprise environment involve implementing password based encryption systems for securing the documents. However, the password based encryption systems do not provide effective protection to the documents of the enterprise, as passwords can be communicated orally or in a written form to other users. In such scheme or any other schemes relying exclusively on cryptography, there are no restrictions on actions that unauthorized users can perform on the documents. Therefore, protecting the documents using passwords or other cryptographic schemes makes the documents substantially vulnerable to unauthorized access.

Another conventional approach to protect the documents within the enterprise environment is to store the documents on a secured computer, thus making the documents accessible only to authorized personnel. When the documents need to be duplicated or circulated, users seeking access typically follow secure administration procedures or policies to prevent any unauthorized access. However, this approach is inadequate because the administration procedures are difficult to manage. Such procedures require extensive training and enforcement, and may also be expensive to implement and monitor. Also, these procedures are often ineffective because it is cumbersome for people to review and modify the documents stored on the secured computer. Therefore, people tend to work on the documents stored on their personal computing devices. However, once the documents leave the individual computing devices, the above mentioned secured approach is no longer applicable and the administration procedures become ineffective.

To this end, devices and methods for enterprise digital rights management (eDRM) are described herein. The eDRM device described herein enables users within an enterprise to protect the documents. Further, the eDRM device enables the users to control access to protected documents even if the protected documents leave the eDRM devices of the users. The users can be divided into assignors and assignees. The assignors include document owners, temporary owners, and administrators, while the assignees can be any user in the enterprise. For the sake of clarity, a brief explanation to differentiate the users within the enterprise is provided. The owners may be understood as users having ownership of at least one document and thus, the owner can protect the document, share the protected document with other users, and assign access rights to other users for accessing the protected documents, and control access of the other users from accessing the protected document. Additionally, the owner can temporarily assign the ownership of the protected documents to another user within the enterprise. The assignees may be understood as regular users or a group of users without ownership of the protected documents. The administrators may be understood as users having administrative powers to control and manage all the owners, assignees, and/or eDRM devices within the enterprise.

In an implementation, a plurality of eDRM devices communicates with an eDRM server. A plurality of users may use the eDRM devices to protect the documents, access the protected documents, and/or manage the protected documents. In an example, the users, such as owners, may use the eDRM devices to protect the documents owned by them. The owners may protect the documents if the documents are required to be shared or circulated to the other users. In said example, the owners may also use the eDRM devices to access the protected documents owned by them or received from other users. In another example, users such as the assignees may use the eDRM devices to access the protected documents received from owners and other assignees. In yet another example, the users, such as administrators, may use the eDRM devices to protect the documents, access the protected documents, and/or manage the protected documents within the enterprise. In addition to the protected documents, the administrators may also manage all the users and the eDRM devices within the enterprise.

In an implementation, the eDRM devices may be equipped with a secure viewer interface for protecting the documents. In said implementation, one or more eDRM devices may also be equipped with an administrative interface for managing the protected documents, users, and/or other eDRM devices. In an example, the regular users and the owners may be presented with the secure viewer interface, while the administrators may be presented with the administrative interface.

To protect the document, a user may browse and select the document to be protected via the secure viewer interface of the eDRM device. Based on the selection, the eDRM device encrypts the document using cryptography techniques known in the art to generate the protected document. The user will henceforth be considered the owner of the document.

Access to the protected documents may be defined and controlled by the owners and the administrators in the form of access rights. Examples of the access rights include, but are not limited to, a read access, a write access, a copy access, and a print access. The access rights enable the users to open the protected documents, make changes to the protected documents, copy text, capture screen snapshots of the protected documents, and print a hard copy of the protected documents.

In operation, based on the preferences of the assignor, the eDRM device assigns one or more access rights to any user within the enterprise. Such access rights define access of the users to the protected document. For example, the access rights may specify if a user has full access or limited access to the protected documents. The users without an explicit access right over the protected document will be denied access.

In addition to defining access rights, the eDRM devices in communication with the eDRM server also provide other access control features, such as user and document locking, assigning temporary ownership, and delegating access rights.

The user locking feature enables the administrator to lock the users. Locking a user restricts the user from accessing the protected documents. Further, locking the user at a time when a protected document is open at an eDRM device may lead to immediate shut down of the protected documents. It is to be understood that locking the user does not modify the existing access rights of the user. The same access rights are available for the user when the user is unlocked by the administrator.

The document locking feature enables administrators to lock any protected document. Further, the locking feature enables the users to lock any protected document which is owned by them. Locking the protected document restricts the other users from accessing the protected document, irrespective of the access rights the other users hold over the protected document.

The temporary ownership feature enables the owners to assign temporary ownership of their protected documents to another user. Further, the temporary ownership feature enables administrator to assign temporary ownership of the protected documents of one user to another user within the enterprise. The temporary ownership may be assigned for certain time period, and it expires at the expiry of such time period. The temporary ownership provides the user with all the access rights and authorities of the actual owner, except the authority to assign the temporary ownership and modify the time period of the temporary ownership.

The delegation of access rights feature enables the users having access rights to the protected documents of the owner, to delegate all of their access rights to another user within the enterprise. The user who delegates the access rights to another user is referred to as a delegator, and the user who receives such delegated access rights is referred to as a delegatee.

The eDRM device, therefore, enables the users within the enterprise to protect the documents and implement a fine-grained access control over the protected documents, even if the protected documents leaves the secured eDRM devices of the user.

The manner in which documents of an enterprise are protected and access to the protected documents is controlled is explained further in conjunction with FIGS. 1 to 4. While aspects of systems and methods may be implemented in any number of different computing systems, environments, and/or configurations, the embodiments are described in the context of the following exemplary system architecture(s).

FIG. 1 illustrates an enterprise digital rights management (eDRM) network environment 100, in accordance with an embodiment of the present subject matter. In said embodiment, the eDRM network environment 100 includes an eDRM server 102. The eDRM server 102 may be implemented as any of a variety of computing devices, including, for example, a server, a workstation, and a mainframe computer. The eDRM server 102 is in communication with a plurality of eDRM devices 104-1, 104-2, 104-3, . . . , 104-N, hereinafter referred to as the eDRM device(s) 104. The eDRM devices 104 may be implemented as computing devices, such as a desktop PC, a notebook, and a portable computer.

The eDRM devices 104 are connected to the eDRM server 102 over a network 106 through one or more communication links. The communication links between the eDRM devices 104 and the eDRM server 102 are enabled through a desired form of communication, for example, via dial-up modem connections, cable links, and digital subscriber lines (DSL), wireless or satellite links, or any other suitable form of communication. In an implementation, the network 106 may be an enterprise network, including personal computers, laptops, various servers, such as blade servers, and other computing devices.

Further, the network 106 may also be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include network devices, such as network switches, hubs, routers, and Host Bus Adapters (HBAs), for providing a link between the eDRM devices 104 and the eDRM server 102. The network devices within the network 106 may interact with the eDRM devices 104 and the eDRM server 102 through the communication links.

In operation, the eDRM devices 104 receive requests from one or more assignors, such as owners and administrators, to protect documents and control access of other users to protected documents. In an implementation, the eDRM devices 104 may be configured with a secure viewer interface through which the owners browse and select one or more documents to be protected. Alternatively, the eDRM devices 104 may be configured with an administrative interface via which the administrators browse and select one or more documents to be protected. The documents may contain confidential information in digital format.

Once the document to be protected is selected by the assignor, the eDRM device 104 generates two copies of a security key. The security key may consist of a cryptographic key and an initialization vector. In an implementation, the eDRM device 104 generates a unique security key for the selected document. The eDRM device 104 saves one copy of the security key onto the eDRM device 104 and sends another copy of the security key to the eDRM server 102. It is to be understood that eDRM server 102 may store the security key either internally within the eDRM server 102, or externally within a repository associated with the eDRM server 102. Once the security key is sent to the eDRM server 102, the eDRM device 104 retrieves a document identifier (ID) from the eDRM server 102. Subsequently, the eDRM device 104 encrypts the selected document using the security key alone or in combination with the document ID retrieved from the eDRM server 102 to generate a protected document. It is to be understood that whenever the security key for the document to be protected is sent to the eDRM server 102, the eDRM server 102 generates a document ID for the selected document and stores the same within the eDRM server 102. Along with the document ID, the eDRM server 102 also stores a user ID of the user whose document is to be protected. The eDRM server 102 may store the user ID and document ID information, for example, in form of a user and document table.

In an implementation, the eDRM device 104 includes an access control module 108 that controls access of the users to the protected document. In said implementation, the access control module 108 allows assignors to assign one or more access rights to other users within the enterprise. Such access rights define access of the user to the protected document. Examples of the access rights may include, but are not limited to, rights to open, edit, copy, and print the protected documents. In an example, if the owner wishes to share the protected documents with other users within the enterprise, the owner may assign one or more access rights to the other users. In said example, same or different access rights may be assigned to one or more users based on the preferences of the assignor.

In addition to assigning access rights, the access control module 108 may lock/unlock user based on locking instructions received from an administrator. Also, the access control module 108 may lock/unlock the documents based on locking instructions provided by the owner and the administrator. In an implementation, the administrators may use the administrative interface via which the administrator provides locking instructions to the access control module 108, while the owners may use the secure viewer interface using which the owner provides locking instructions to the access control module 108.

Further, the access control module 108 may delegate the access rights of one user to another user. For example, if an owner grants open and copy request to an assignee, the assignee may further delegate the access rights to another user. In such a scenario, the user who delegates the access rights is referred to as a delegator, and the user who receives such delegated access rights is referred to as a delegatee.

Furthermore, the access control module 108 may assign temporary ownership of the documents from one user to another user for certain time period. For example, owners may temporarily assign the ownership of their documents to any other user within the enterprise if the owner is going on a leave. In said example, the owners may set the time period till which such ownership will remain active. Such temporary ownership expires at the expiry of the preset time period. The users with temporary ownership are provided with all the access rights and authorities of the owner, except authority to assign temporary ownership, and modify the time period of the temporary ownership.

Figure 2:
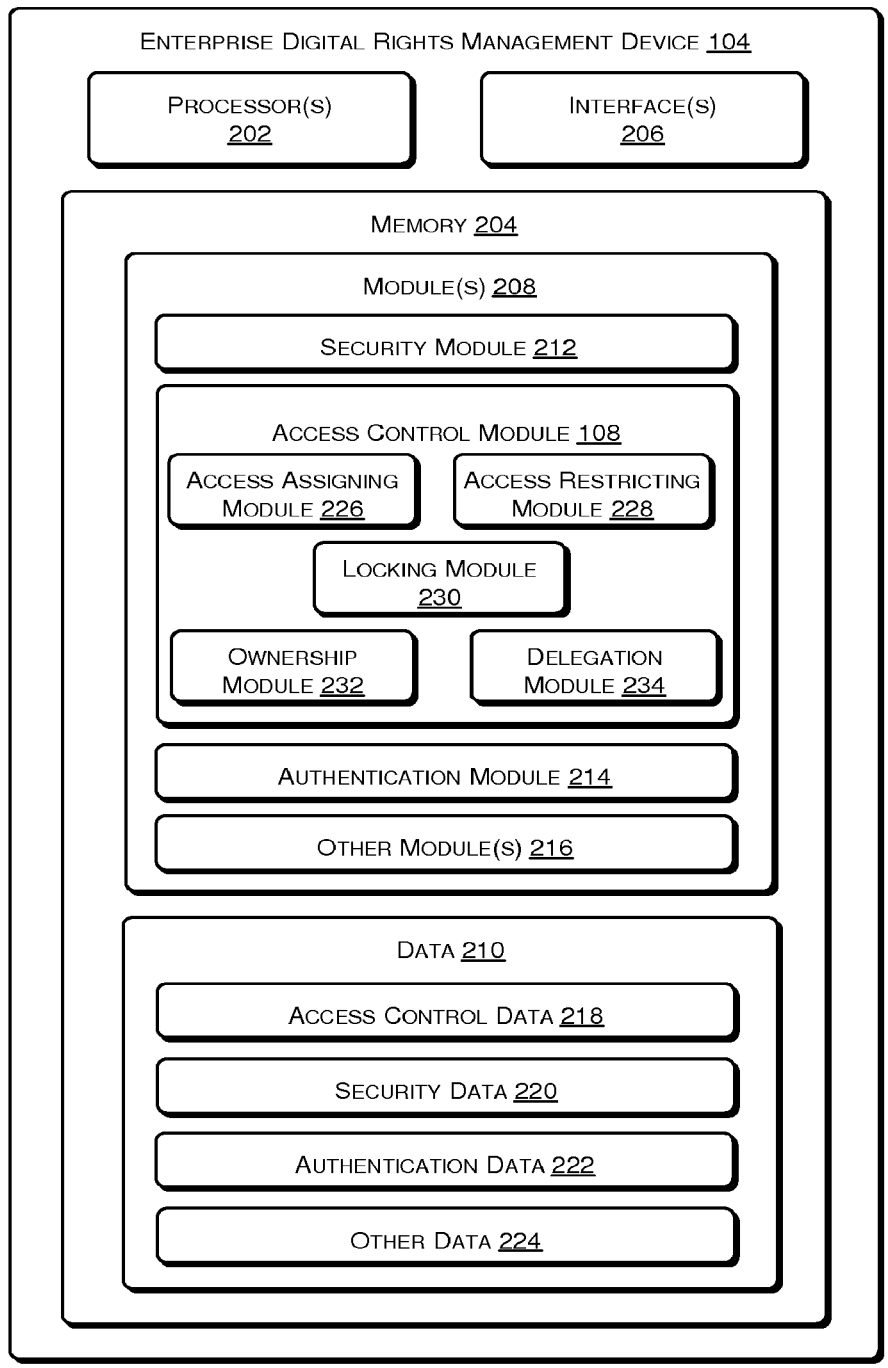
FIG. 2 illustrates components of an eDRM device, in accordance with an embodiment of the present subject matter.

FIG. 2 illustrates components of an eDRM device 104, according to an embodiment of the present subject matter. In said embodiment, the eDRM device 104 includes one or more processor(s) 202, a memory 204 coupled to the processor 202, and interface(s) 206.

The processor 202 can be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The interfaces 206 may include a variety of software and hardware interfaces, for example, interface for peripheral device(s) such as a keyboard, a mouse, an external memory, a printer, etc. Further, the interfaces 206 may enable the eDRM device 104 to communicate with other computing devices, such as web servers and external databases. The interfaces 206 may facilitate multiple communications within a wide variety of protocols and networks, such as a network, including wired networks, e.g., LAN, cable, etc., and wireless networks, e.g., WLAN, cellular, satellite, etc. The interfaces 206 may include one or more ports to allow communication between the eDRM devices 104 and the eDRM server 102.

The memory 204 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 204 also includes module(s) 208 and data 210.

The modules 208 include routines, programs, objects, components, data structures, etc., which perform particular tasks or implement particular abstract data types. In one implementation, the modules 208 include a security module 212, the access control module 108, an authentication module 214, and other modules 216. The access control module 108 further includes an access assigning module 226, an access restricting module 228, a locking module 230, an ownership module 232, and a delegation module 234. The other modules 216 may include programs or coded instructions that supplement applications and functions, for example, programs in the operating system of the eDRM device 104.

The data 210, amongst other things, serves as a repository for storing data processed, received, and generated by one or more of the module(s) 208. The data 210 includes access control data 218, security data 220, authentication data 222, and other data 224. The other data 224 includes data generated as a result of the execution of one or more modules in the other modules 216.

The eDRM device 104, in accordance with the present subject matter, provides two levels of security to the documents within the enterprise. The eDRM device 104 achieves a first level of security by authenticating the identity of the user and encrypting the documents, using cryptographic techniques, to generate the protected documents. Also, the eDRM device 104 achieves a second level of security by controlling access to the protected documents. The entire security procedure implementing both the levels of security is explained in detail under the following sections, viz., user authentication, document encryption, and access control.

User Authentication

In operation, the eDRM device 104 receives as login credentials from the user. The login credentials may include, for example, a user ID and a password. Based on the login credentials, the eDRM device 104 authenticates the user. Such authentication may be performed using authentication techniques known in the art. For example, using existing Lightweight Directory Access Protocol (LDAP) Directories, or digital certificate.

In operation, the authentication module 214 authenticates the user based on the received login credentials. The authentication module 214 performs such authentication by comparing login credentials entered by the user with login credentials pre-stored in the authentication data 222. If comparison indicates that the login credentials provided by the user are correct, the user is authenticated and access to the eDRM device 104 is allowed. On the other hand, if the comparison indicates that the login credentials provided by the user are incorrect, the user authentication fails and access to the eDRM device 104 is restricted until the correct login credentials are entered by the user. It is to be understood that the authentication data 222 is shown within the data 210 for the purpose of clarity. However, such authentication data 222 may also be placed in an external repository associated with the eDRM device 104. For example, the authentication data 222 may be stored in an LDAP server (not shown), if the authentication is performed using LDAP Directories.

Document Encryption

The eDRM device 104 may receive a document protection request from an authenticated user for protecting a document. The eDRM device 104, for example, may be equipped with the secure viewer interface via which the owners browse and select the documents to be protected. Once the document to be protected is selected by the user, the security module 212 generates two copies of the security key. In an implementation, the security module 212 generates the unique security key for each document. The security module 212 saves a copy of the security key security data 220 and sends another copy of the security key to the eDRM server 102. Once the security key is sent to the eDRM server 102, the security module 212 retrieves the document identifier (ID) from the eDRM server 102. The security module 212 then encrypts the document using the security key alone or in combination with the document ID retrieved from the eDRM server 102 to generate the protected document. It is to be understood that whenever the security key for the document to the protected is sent to the eDRM server 102, the eDRM server 102 generates a document ID for the document to be protected and stores the same within the eDRM server 102. Along with the document ID, the eDRM server 102 also stores a user ID of the user whose document is to be protected. The eDRM server 102 may store the user ID and the document ID information, for example, in form of a user and document table.

In addition to the security key, the security module 212 may also store metadata pertaining to the protected documents in the security data 220. Examples of meta data include, but are not limited to, magic number, file version number, encrypted security key, and document initialization vector.

The protected documents generated by the security module 212 may be thereafter distributed or shared with one or more other users within the enterprise. For example, the owner can share the protected documents with other users via electronic mail and/or any file sharing method known in the art.

Access Control

The eDRM device 104 provides a first level of security to the documents from unauthorized access by protecting the documents using cryptographic techniques. In addition, the eDRM device 104 further provides a second level of security to the documents by allowing users to control access to the protected documents and ensures that the confidential information within the protected documents reaches only those parties who are accountable for its application or implementation. In one implementation, the access is controlled by assigning one or more access rights to the users if the protected documents need to be circulated to the users. Further, the access is controlled by locking user/documents, delegating the access rights to other users within the enterprise, and assigning temporary ownership of the documents to another user if the owner is temporarily unavailable. The manner in which the access control may be achieved is explained in detail in the following subsections, viz., assigning access rights, locking user/document, and delegating access rights.

Assigning Access Rights

The assignors, such as the owners and the administrators, may control the other users within the enterprise from accessing the protected documents, by assigning one or more access rights to the other users. In an implementation, the access rights include rights mentioned in Table 1 below. It is to be understood that different types of access rights described in the Table 1 are only for the purpose of explanation and various other types of access rights may also be implemented. For example, rights to access the protected documents offline may also be implemented.

TABLE 1

| Access Right | Description |
| --- | --- |
| Open | User can open a protected documents |
| Edit | User can edit or modify data in the protected documents |
| Copy | User can copy data from the protected documents and/or can take screen snapshots of the protected documents |
| Print | User can print the protected documents |

In an implementation, different access rights may be assigned to one or more users, such as the assignees or the other owners. For example, a user A may be provided with access right to open and print the documents, and another user B may be provided with access right to open, edit, and print the documents. In another implementation, same access rights may be assigned to one or more users. For example, the users A and B may be provided with access to open, edit, and print the documents.

In operation, the access assigning module 226 assigns one or more access rights to a user or a group of users, based on preferences of the assignor having rights over the documents. The access assigning module 226 stores information pertaining to the assignment of the access rights in the eDRM server 102. In addition to assigning the access rights, the access assigning module 226 may also update the assignment of the access rights, based on updation instructions from the assignor. The updation instructions may include instructions for granting one or more new access rights to the users and revoking one or more previously granted access rights to the user. Based on the updation instructions, assignment of the access rights is updated and access rights assignment information in the eDRM server 102 is updated with the new access right assignment information. In an implementation, the eDRM server 102 may be associated with a repository for storing such access rights assignment information. The repository may be an external repository associated with the eDRM server 102.

Delegating Access Rights

In addition to the access rights indicative above, right to delegate the access rights to other users may also be provided to the users. Therefore, the eDRM device 104 allows the users, having right to delegate the protected documents, to delegate all of the other access rights they are holding to the other users within the enterprise. In an example, if a user, such as the owner, has granted rights to open, edit and print the documents to the assignee and if the assignee has right to delegate the access rights, the assignee may further delegate such assign rights to another user within the enterprise. It is to be understood that the user who delegates the access rights is referred to as delegator, and the user who receives the delegated access rights is referred to as delegatee.

In operation, the delegation module 234 delegates the access rights based on delegation information received from the delegator. The delegator specifies the delegatee to whom the access rights are to be delegated. The delegation module 234 receives the delegation information from the delegator and delegates the access rights of the delegator to the delegatee. The delegation module 234, thereafter, stores the delegation information in the eDRM server 102. The delegation information may include, for example, the document ID for which the access rights are delegated, the delegator ID, and the delegatee ID. It is to be understood that the delegator ID is the user ID of the user who is delegating the access rights, and the delegatee ID is the user ID of the user who is receiving the delegated access rights.

Assigning Temporary Ownership

In an implementation, the eDRM device 104 allows the users to assign temporary ownership of all the documents owned by the user to another user for a certain time period. For example, the owners may assign temporary ownership of the protected documents they own to any other user within the enterprise if the owner is going on a leave. In said example, the owners may set the time period till which such ownership will remain active. The user to whom a temporary ownership is assigned is known as a temporary owner. The temporary owner has all the rights of the owner, except the right to change the time period of the temporary ownership and to assign the temporary ownership to the other users. In another implementation, the eDRM device 104 allows the administrators with administrative powers to assign the temporary ownership for one user to another user within the enterprise. In said implementation, the administrators also have the administrative power to change the time period of the temporary ownership.

In operation, the ownership module 232 assigns the temporary ownership of the documents from one user to another user based on the ownership assignment instructions. The ownership assignment instructions may include, for example, a temporary owner ID, and time period for which the ownership is assigned. Subsequent to assigning the ownership, the ownership module 232 stores the information related to assignment of the temporary ownership, such as the temporary owner ID and the time period for which the ownership is assigned in the eDRM server 102.

It is to be understood that when the temporary ownership is active, the temporary owner may enjoy the access rights of the owner. However, once the time period of the temporary ownership expires, the temporary ownership is disabled. However, the access rights that were assigned and delegated to the temporary owner, if any, stay intact.

Locking User/Documents

In an implementation, the eDRM device 104 allows the administrators to lock any other user or the protected document. Further, the eDRM device 104 allows the owners to lock any protected document which they own. Locking a user may be understood as preventing a user from accessing the protected documents, irrespective of the access rights the users holds over the protected documents. For example, if a user has access to open and edit the protected documents, and the user is locked by the administrator, any access request from the locked user for accessing the protected documents will not be entertained. In case the protected documents have already been opened at the eDRM device 104, the user's access to the protected documents is forcefully terminated and an alert message, such as "user is locked" may be displayed to the user on the eDRM device 104. When the user is unlocked by the administrator, any further access request by the user for accessing the protected documents may be accepted, if the user is holding the access rights, whether granted or delegated. It is to be understood that locking the user does not modify the access rights of the user.

On the other hand, locking the protected document may be understood as preventing any user from accessing the protected document, irrespective of the access rights the users are holding over the protected document. In the event that a locked protected document is already open at one or more eDRM devices 104, the user's access to the protected document will be forcefully terminated.

In operation, the locking module 230 locks the user and/or the protected documents and stores locking information in the eDRM server 102. The locking information, for example, may include a user ID of the locked user, and/or document ID of the locked document. Such locking information is stored in the eDRM server 102, along with the user ID and document ID information. In an implementation, the eDRM server 102 stores the locking information in the user and documents table. Such tables may contain a locking information field. The contents of the locking information field indicate if the user ID or a documents ID is locked or unlocked.

The locking module 230 is configured to check such user and content table at predefined time intervals, for example every 30 seconds, to determine if the user ID and/or the document ID is locked. If the user and content table indicates that the user ID or the document ID is locked, the already open documents will be forcefully shut down. Such checking of the locking information at regular intervals is referred to as polling mechanism.

It is to be understood that in addition to the access control features described above, other access control features, such as transferring ownership, time shifting portability, space shifting portability, platform shifting portability, etc., may also be implemented. For the sake of clarity a brief explanation of such additional features is provided.

Transferring ownership: Permanently transferring ownership of the documents from one user to other user within the enterprise. For example, if a user leaves an organization, the ownership of the user may be transferred to some other user within the enterprise.

Time shifting: Enabling the users to access the protected documents at the time when they want to.

Space shifting portability: Enabling the users to freely access the protected documents on any computing device they wants.

Platform shifting portability: Enabling the users to use different operating systems to access the protected documents.

Figure 3:
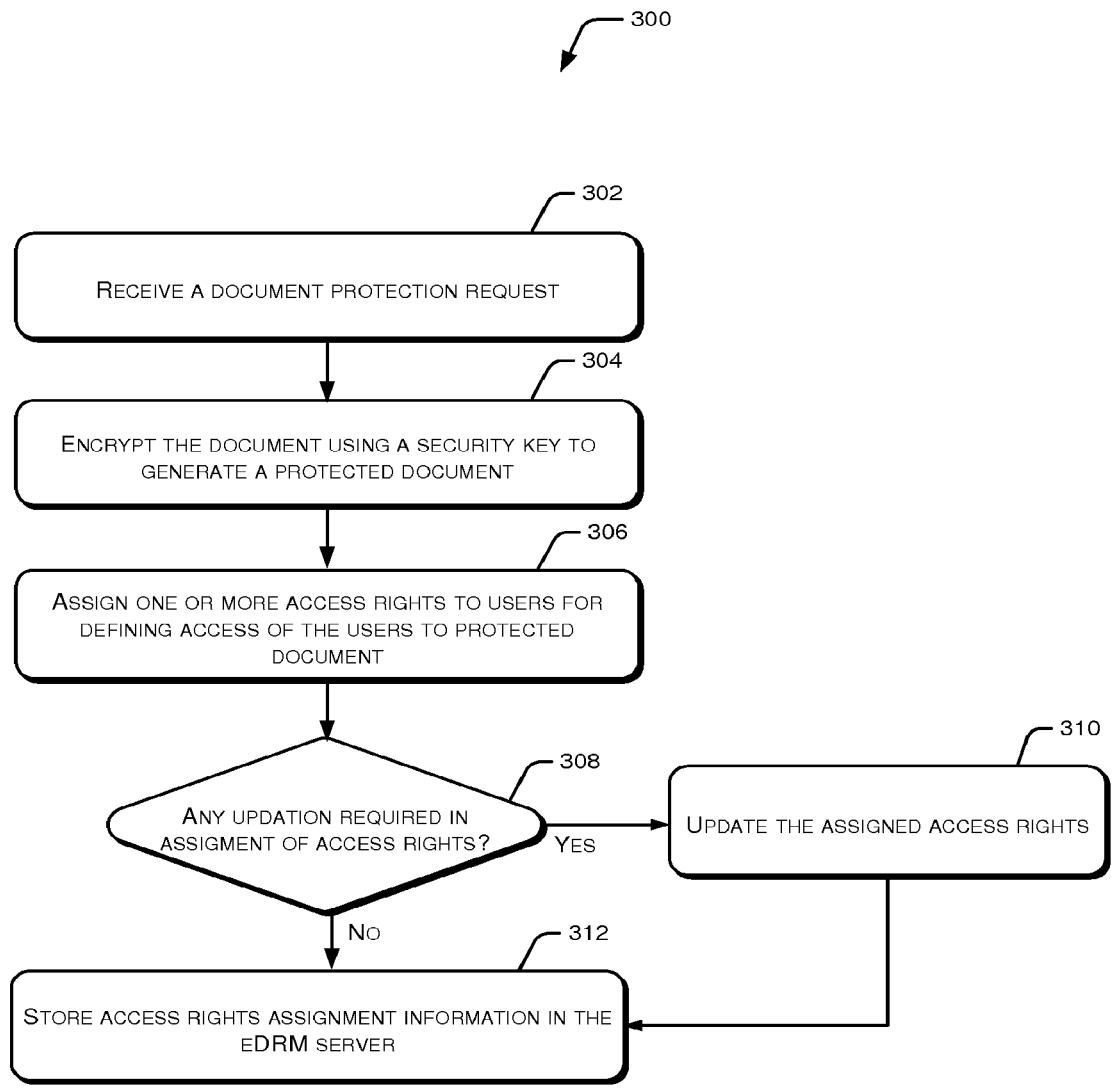
FIG. 3 illustrates a method for protecting documents using the eDRM device, in accordance with an embodiment of the present subject matter.
Figure 4A:
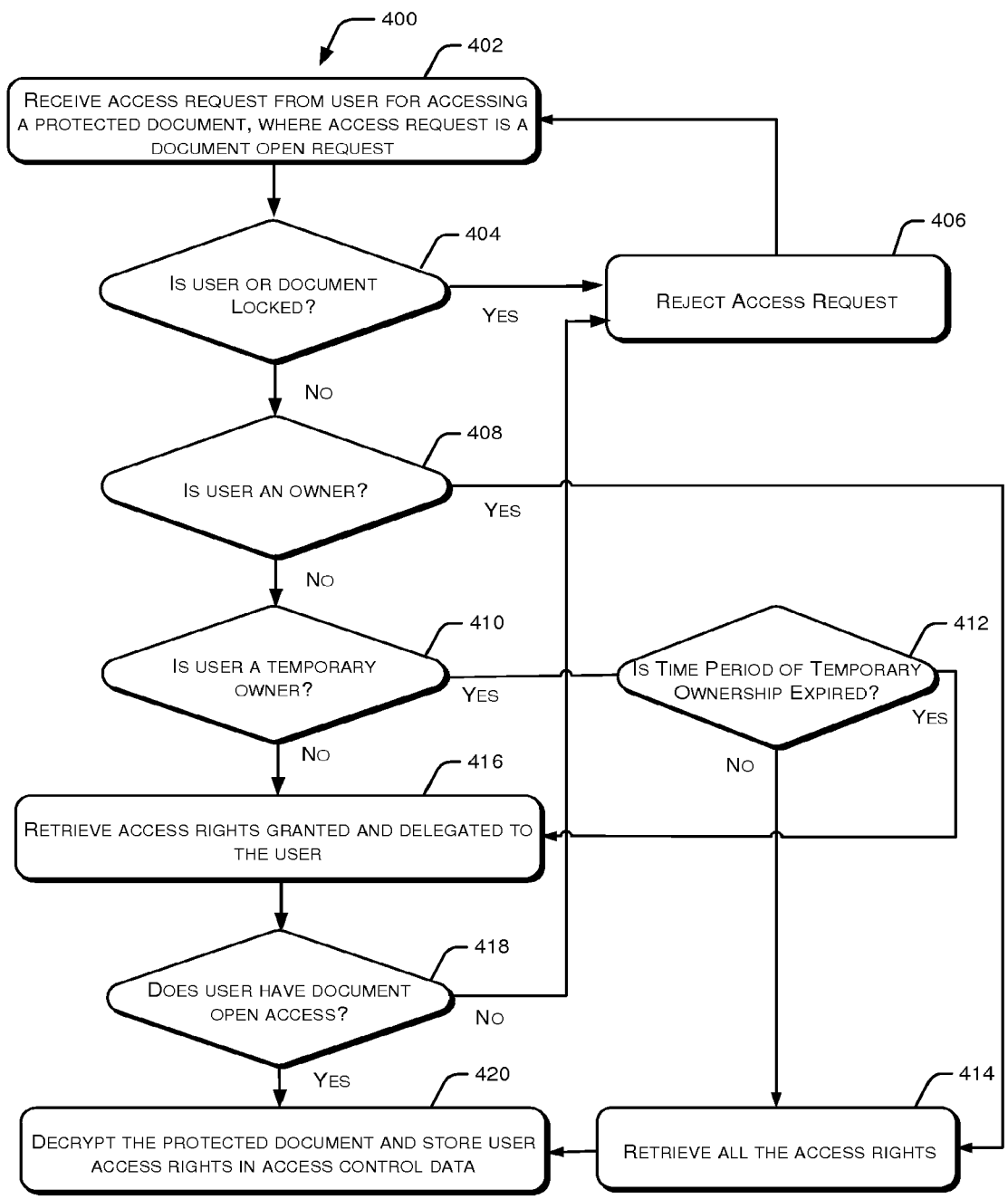
FIGS. 4(a) and (b) illustrate methods for securely accessing protected documents using the eDRM device, in accordance with an embodiment of the present subject matter.
Figure 4B:
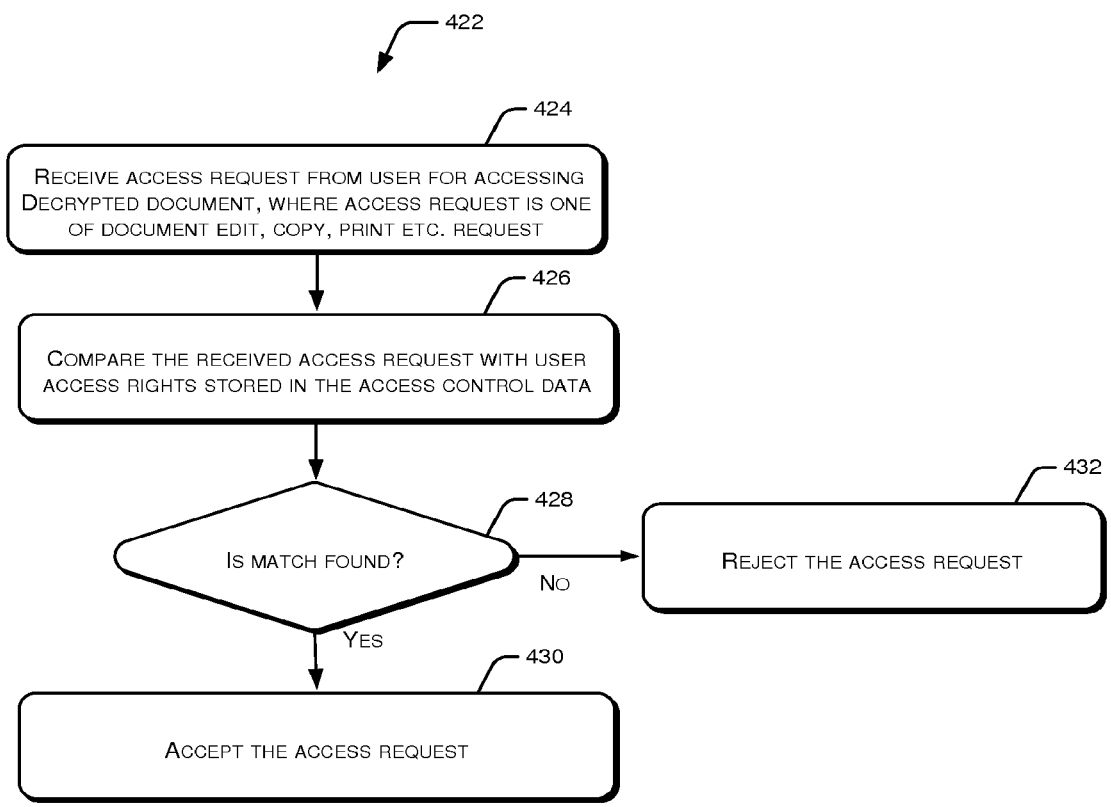

FIG. 3 illustrates a method 300 for protecting documents using the enterprise digital rights management (eDRM) device 104, in accordance with an embodiment of the present subject matter, and FIG. 4a and FIG. 4b illustrate methods 400, 422 for securely accessing the protected documents, in accordance with an embodiment of the present subject matter. The methods may be described in the general context of computer executable instructions. Generally, computer executable instructions can include routines, programs, objects, components, data structures, procedures, modules, functions, etc., that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

The order in which the methods are described is not intended to be construed as a limitation, and any number of the described method blocks can be combined in any order to implement the methods, or alternative methods. Additionally, individual blocks may be deleted from the methods without departing from the spirit and scope of the subject matter described herein. Furthermore, the methods can be implemented in any suitable hardware, software, firmware, or combination thereof.

Referring to FIG. 3, the method 300 for protecting one or more documents using an enterprise digital rights management (eDRM) device initiates at block 302, where a document protection request is received from the user. In an implementation, the user, such as the owner may log into the eDRM device 104 with login credentials. The login credentials may include a user ID, a password, and domain information. Based on the login credentials, the user is authenticated using authentication techniques known in the art. The authenticated user may access the eDRM device 104 for protecting the documents. In operation, the authenticated user may send a content protection request to the eDRM device 104 by selecting the documents to be protected. A security module 212 within the eDRM device 104 receives such a document protection request of the user.

At block 304, in response to the document protection request, the eDRM device 104 generates a unique security key. A copy of the security key is saved on the eDRM device 104 and another copy of the security key is sent to the eDRM server 102. The eDRM device 104 encrypts the document using the security key to generate a protected document.

At block 306, one or more access rights may be assigned to the users for defining access of the users to the protected documents. Such access rights may include, but are not limited to, rights to open, edit, copy, and print the protected documents. In an example, same or different access rights may be granted to one or more users. In an implementation, an access assigning module 226 within the eDRM device 104 assign access rights to the users within the enterprise based on the instructions received from the assignor, such as the owner of the documents.

At block 308, a check is conducted to determine if any updation in the assignment of the access rights is required. Such updation, for example, may include adding new access rights, or revoking previously granted access rights. If any updation is required ("Yes" Branch from block 308), the access rights are updated at block 310, and the updated access rights assignment information is stored in the eDRM server 102, at block 312. On the other hand, if no updation is required ("No" Branch from block 308), the access rights assignment information is stored in the eDRM server 102, at block 312. In operation, an access assigning module 226 updates the access rights, and store the updated access rights assignment information in the eDRM server 102. It is to be understood that the eDRM server 102 may store the access rights assignment information in an external repository associated with the eDRM server 102.

The eDRM device 104, therefore, provides a two level security to the documents. Specifically, the eDRM device 104 provides a first level of security by encrypting the documents. Further, the eDRM device 104 provides a second level of security by assigning one or more access rights to the users within the enterprise for defining access of the user to the protected documents. In an example, the assignors, such as the owner of the documents, may provide instructions to the eDRM device 104 to assign all the access rights or limited access rights to the other users within the enterprise. Once the documents are protected with the encryption and access rights, the user may circulate or distribute the protected documents to other users.

FIG. 4a and FIG. 4b illustrates methods 400, 422 for securely accessing the protected documents, in accordance with an embodiment of the present subject matter.

FIG. 4a illustrates a method 400 to control access of opening a protected document, according to an embodiment of the present subject matter.

At block 402, an access request is received from a user for accessing a protected document, where the access request is a document open request. The document open request may be understood as a request for opening a protected document. In an implementation, the access control module 108 within the eDRM device 104 receives the access request.

At block 404, upon receiving the access request, a check is made to determine if the user making the access request is a locked user or the document for which access request is made is a locked document. Such determination is made by accessing locking information stored in the eDRM server 102. It is to be understood that the eDRM server 102 maintains a table containing user information, such as user ID, and a documents information, such as a documents ID. Along with each user ID and documents ID, a locking information is also stored in the eDRM server 102 in form of a locking field, which indicates if the user ID and/or the document ID is 'locked' or 'unlocked'. If the determination yields that at least one of the user and document is locked ("Yes" Branch from the block 404), the access request of the user is rejected at block 406 and an error code or an alert message indicating that the user and/or the documents is locked may be displayed to the user on the eDRM device 104. However, if the user or the document is not locked ("No" Branch from the block 404), a further determination is made for ascertaining whether the user is an owner or not at block 408.

At the block 408, if the determination yields that the user is an owner ("Yes Branch from the block 408), all the access rights are retrieved from the eDRM server 102. In an implementation, the access control module 108 retrieves all the access rights from the eDRM server 102 at block 414. Further, the access control module 108 stores all the retrieved access rights in the access control data 218, within the eDRM device 104 at block 420. However, if the determination yields that the user is not an owner ("No Branch from the block 408), a further determination is made to ascertain whether the user is a temporary owner or not at block 410.

The determination at block 410 is made from the temporary ownership data stored in the eDRM server 102. If the determination indicates that the user is a temporary owner ("Yes" Branch at block 410), a further check is performed at the block 412, to determine if time period of the temporary ownership has expired. If the determination indicates that the time period of the temporary ownership has not expired ("No" Branch from the block 412), the eDRM device 104 retrieves all the access rights from the eDRM server 102 at block 414. Further, the eDRM server 102 decrypts the protected document and stores all the retrieved access rights in the access control data 218 at block 420. On the other hand, if the determination indicates that the time period of the temporary ownership has expired ("Yes" Branch from the block 412), the method step 416 is performed.

If the check made at block 410 indicates that the user is not a temporary owner ("No" Branch at block 410), or if the user is found to be a temporary owner, but the temporary ownership has expired ("Yes" Branch from the block 412), the access rights granted and delegated to the user are retrieved from the eDRM server 102, if any, at block 416. Further, at block 418 a determination is made if the access requested by the user, i.e., the document open request matches with any of the retrieved access rights. If the determination indicates that the requested access right matches with the retrieved access right ("Yes" Branch from the block 418), the eDRM device 104 decrypts the protected document and stores the retrieved access rights in the access control data 218. However, if the determination indicates that the requested access right does not match with any of the retrieved access rights ("No" Branch from the block 418), the eDRM device 104 rejects the access request of the user.

FIG. 4b illustrates a method 422 to control access of one or more open protected documents to a user, according to an embodiment of the present subject matter.

At block 424, an access request is received from the user, where the access request is one of the document edit request, document copy request, and document print request. In an implementation, the access assigning module 226 receives the access request from the user.

At block 426, the access requested by the user is compared with the access rights of the user stored in the access control data 218. In an implementation, the access assigning module 226 compares the access requested with the access rights corresponding to the user stored in the access control data 218.

At block 428, a determination is made if the access requested matches with any of the access rights of the user stored in access control data 218 ("Yes" Branch from the block 428), access request of the user is accepted. Accepting the access request of the user means that the user is allowed to perform the access requested by the user. However, if the determination made at block 428 yields that the access requested by the user does not matches with any of the access rights of the user stored in access control data 218 ("No" Branch from the block 428), access request of the user is rejected at block 432. Rejecting the access request of the user means that the user is restricted from performing the access requested by the user. In an implementation, the access restricting module 228 restricts the user from performing the requested operation.

Although embodiments for enterprise digital rights management have been described in language specific to structural features and/or methods, it is to be understood that the invention is not necessarily limited to the specific features or methods described. Rather, the specific features and methods are disclosed as exemplary implementations for the enterprise digital rights management.

We claim:

1. A device for controlling access to a protected document within an enterprise, the device comprising:
   a processor; and
   a memory coupled to the processor, the memory comprising:
      a security module configured to:
         generate two copies of a security key for the document, wherein one copy of the security key is stored in the memory and another copy of the security key is sent to a server;
         encrypt the document using the security key, and
         generate a protected document based on the encryption of the document; and
      an access control module configured to:
         assign access rights to a user for accessing the protected document;
         delegate the access rights from the user to an other user;
         lock at least one of the user, the other user, and the protected document; and
         unlock at least one of the user and the other user such that the access rights are available again to the at least one of the user and the other user.

2. The device as claimed in claim 1, wherein the access control module is further configured to:
   receive an access request from the user for accessing the protected document;
   compare the access request with the access rights associated with the user; and restrict the user from accessing the protected document based on the comparison.

3. The device as claimed in claim 1, wherein the access control module is further configured to:
receive an access request from the user for accessing the protected document, wherein the access request is a request for opening the protected document;
determine if at least one of the user and the protected document is locked; and
restrict the user from accessing the protected document based on the determination.

4. The device as claimed in claim 1, wherein the access control module is further configured to ascertain at predefined time intervals whether at least one of the user and the protected document is locked.

5. The device as claimed in claim 1, wherein the access control module is further configured to assign temporary ownership of the protected document to the other user.

6. The device as claimed in claim 1, wherein the access control module is further configured to:
receive an access request from the user for accessing the protected document, wherein the access request is a request for opening the protected document;
ascertain whether at least one of the user and the protected document is unlocked;
determine whether the user is an owner, if at least one of the user and the protected document is unlocked; and
decrypt the protected document and allow the user to access the protected document, based on the determination.

7. The device as claimed in claim 1, wherein the access control module is further configured to:
receive an access request from the user for accessing the protected document, wherein the access request is a request for opening the protected document;
ascertain whether at least one of the user and the protected document is unlocked;
determine whether the user has temporary ownership and a preset time period of the temporary ownership has expired, if at least one of the user and the protected document is unlocked;
compare the access request with the access rights associated with the user, based on the determination; and
restrict the user from accessing the protected document based on the comparison.

8. A computer-implemented method of controlling access to a protected document within an enterprise, the method comprising:
receiving an access request by a user for accessing the protected document, wherein the access request is a request for opening the protected document;
determining whether at least one of the user and the protected document is locked;
rejecting the access request based on the determining, wherein the rejecting comprises restricting the user from accessing the protected document;
unlocking the user such that access rights provided to the user are same as assigned before locking the user; and
decrypting the protected document using a security key corresponding to the protected document if the user has the right to open the protected document, wherein the security key is retrieved from a server.

9. The method as claimed in claim 8 further comprising:
ascertaining whether the user has temporary ownership;
further ascertaining whether a preset time period of the temporary ownership has expired, if the user has temporary ownership; and
determining whether the access request matches with at least one of an access right granted and delegated to the user, if the preset time period of the temporary ownership has expired.

10. A non-transitory computer-readable medium having embodied thereon a computer program for executing a computer-implemented method comprising:
receiving an access request by a user for accessing the protected document, wherein the access request is a request for opening the protected document;
determining whether at least one of the user and the protected document is locked;
rejecting the access request based on the determining, wherein the rejecting comprises restricting the user from accessing the protected document;
unlocking the user such that access rights provided to the user are same as assigned before locking the user; and
decrypting the protected document using a security key corresponding to the protected document if the user has the right to open the protected document, wherein the security key is retrieved from a server.

11. The non-transitory computer-readable medium as claimed in claim 10 further comprising:
ascertaining whether the user has temporary ownership;
further ascertaining whether a preset time period of the temporary ownership has expired, if the user has temporary ownership; and
determining whether the access request matches with at least one of an access right granted and delegated to the user, if the preset time period of the temporary ownership has expired.

12. The system as claimed in claim 1, wherein the access rights include a right to open, edit, copy, and print the document, wherein the access rights for the user are communicated to the server.

13. The system as claimed in claim 1, wherein the access control module is further configured to temporarily assign the access rights to a temporary owner for a preset time period of temporary ownership upon request from the user, wherein the temporary owner gets the access rights of the user, except for a right to change the preset time period of temporary ownership and to grant temporary ownership to others.

14. The system as claims in claim 1, wherein the security key comprises a cryptographic key and a document initialization vector.

15. The system as claimed in claim 1, wherein access to the protected document is forcefully terminated if the protected document is open at the time of locking, and wherein a an alert message about the locking is displayed on the secure user interface.

16. The system as claimed in claim 1, wherein delegation of the access rights from the user to the other user is communicated to the server.

17. The system as claimed in claim 1, wherein locking at least one of the user and other user prevents the at least one of the user and other user from accessing the protected document.

18. The system as claimed in claim 1, wherein locking the protected document prevents all users, except the assignor from accessing the protected document.

19. The system as claimed in claim 1, wherein the assignor is one of a administrator or an owner.

20. The method as claimed in claim 8 further comprising:
determining if the user is an owner of the protected document, wherein the access rights are retrieved and the protected document is decrypted when the user is the owner;

determining if the user is a temporary owner of the protected document and if a preset time period of temporary ownership has expired, wherein the access rights are retrieved and the protected document is decrypted when the user is the temporary owner and the preset time period of the temporary ownership has not expired; and determining if the user has a right to open the protected document in the access rights.

\* \* \* \* \*